US012585586B2

(12) United States Patent
Yadav et al.

(10) Patent No.: US 12,585,586 B2
(45) Date of Patent: Mar. 24, 2026

(54) MANAGING READ LOOK AHEAD CACHING IN STORAGE DEVICES

(71) Applicant: Sandisk Technologies, Inc., Milpitas, CA (US)

(72) Inventors: Akhilesh Yadav, Bengaluru (IN); Ramanathan Muthiah, Bangalore (IN); Shiv Kumar Gupta, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 4 days.

(21) Appl. No.: 18/780,924

(22) Filed: Jul. 23, 2024

(65) Prior Publication Data

US 2026/0030161 A1 Jan. 29, 2026

(51) Int. Cl.
*G06F 12/0802* (2016.01)
*G06F 12/02* (2006.01)

(52) U.S. Cl.
CPC ...... *G06F 12/0802* (2013.01); *G06F 12/0215* (2013.01); *G06F 2212/60* (2013.01)

(58) Field of Classification Search
CPC ............. G06F 12/0802; G06F 12/0215; G06F 2212/60
See application file for complete search history.

(56) References Cited

U.S. PATENT DOCUMENTS 8,966,184 B2 * 2/2015 Atkisson ................. G06F 3/065
711/135
10,990,289 B2 4/2021 Barrell 11,650,924 B2 * 5/2023 Lee ....................... G06F 3/0679
711/137
11,704,249 B2 * 7/2023 Sreedhar ............. G06F 12/0868
711/118
11,816,035 B2 11/2023 Balasubramani
2012/0317364 A1 * 12/2012 Loh ..................... G06F 12/0862
711/137
2017/0371559 A1 * 12/2017 Higgins ................ G06F 3/0611
2022/0253379 A1 * 8/2022 Hu ....................... G06F 12/0653

FOREIGN PATENT DOCUMENTS

WO 2013175625 A1 11/2013

* cited by examiner

*Primary Examiner* — Kaushikkumar M Patel
*Assistant Examiner* — Christian Joseph O'Connell
(74) *Attorney, Agent, or Firm* — Arlene P. Neal; NEAL BLIBO LLC

(57) ABSTRACT

A storage device manages a read look ahead (RLA) buffer with fluctuating RLA caching. The storage device includes a memory device to store data in a format including upper, middle, and lower pages and an RLA buffer to store data retrieved from the memory device. When a controller on the storage device receives a host read request, the controller predicts data to be included in a subsequent host read request. The controller then determines a set of pages storing the predicted data, identifies latency-oriented pages in the set of pages, retrieves data from the latency-oriented pages, and stores the data in the RLA buffer. When the storage device receives the subsequent host read request including the predicted data, the controller reads a first portion of the predicted data from the RLA buffer and a second portion of the predicted data from the memory device.

20 Claims, 7 Drawing Sheets

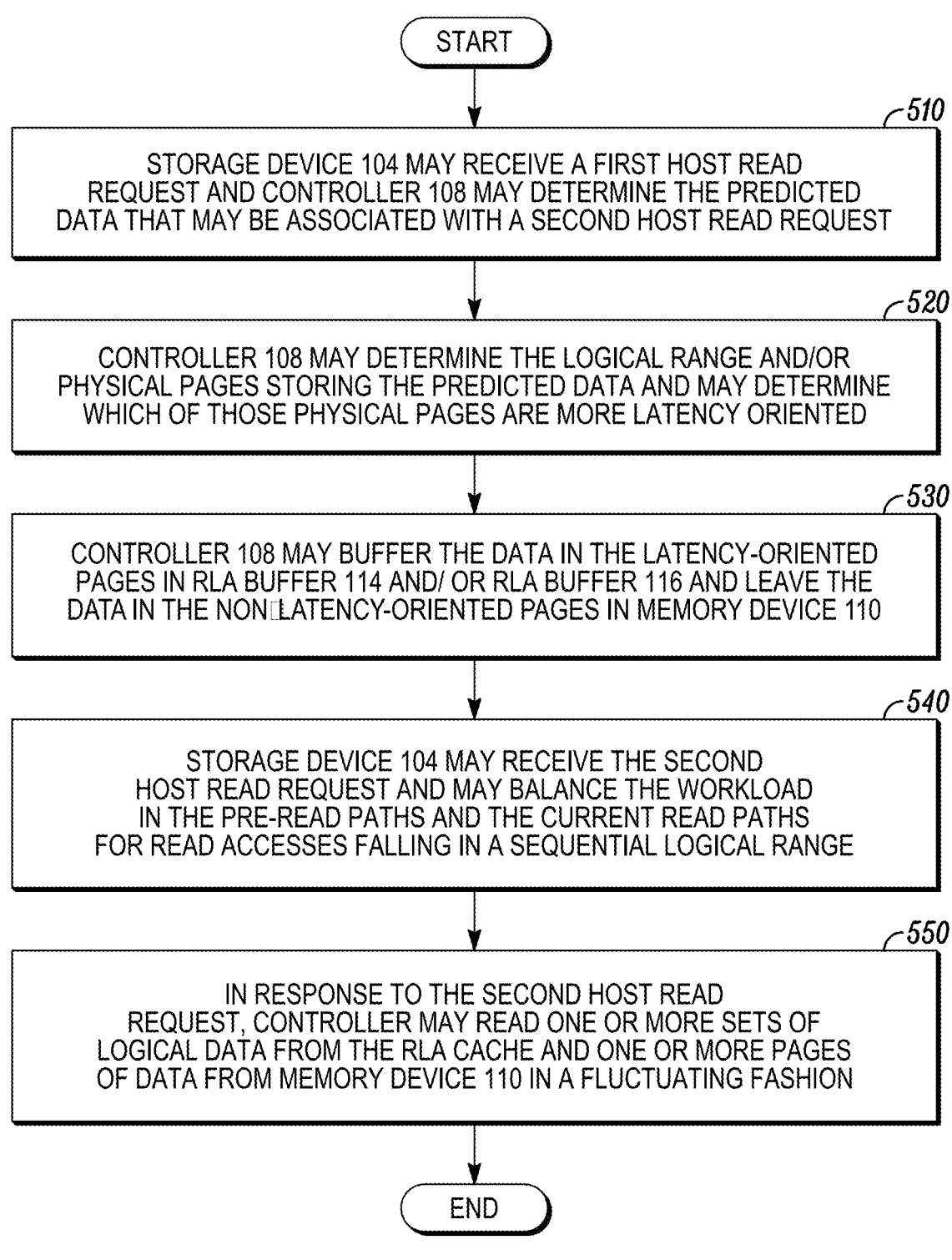

START

STORAGE DEVICE 104 MAY RECEIVE A FIRST HOST READ
REQUEST AND CONTROLLER 108 MAY DETERMINE THE PREDICTED
DATA THAT MAY BE ASSOCIATED WITH A SECOND HOST READ REQUEST
⌐510

CONTROLLER 108 MAY DETERMINE THE LOGICAL RANGE AND/OR
PHYSICAL PAGES STORING THE PREDICTED DATA AND MAY DETERMINE
WHICH OF THOSE PHYSICAL PAGES ARE MORE LATENCY ORIENTED
⌐520

CONTROLLER 108 MAY BUFFER THE DATA IN THE LATENCY-ORIENTED
PAGES IN RLA BUFFER 114 AND/ OR RLA BUFFER 116 AND LEAVE THE
DATA IN THE NON LATENCY-ORIENTED PAGES IN MEMORY DEVICE 110
⌐530

STORAGE DEVICE 104 MAY RECEIVE THE SECOND
HOST READ REQUEST AND MAY BALANCE THE WORKLOAD
IN THE PRE-READ PATHS AND THE CURRENT READ PATHS
FOR READ ACCESSES FALLING IN A SEQUENTIAL LOGICAL RANGE
⌐540

IN RESPONSE TO THE SECOND HOST READ
REQUEST, CONTROLLER MAY READ ONE OR MORE SETS OF
LOGICAL DATA FROM THE RLA CACHE AND ONE OR MORE PAGES
OF DATA FROM MEMORY DEVICE 110 IN A FLUCTUATING FASHION
⌐550

END

FIG. 5

MANAGING READ LOOK AHEAD CACHING IN STORAGE DEVICES

BACKGROUND OF THE INVENTION

A storage device may be communicatively coupled to a host and to non-volatile memory including, for example, a NAND flash memory device on which the storage device may store data received from the host. The memory device may include multiple dies which may be divided into physical blocks and the storage device may store data in blocks on the memory device. Data may be stored in the blocks in various formats, with the formats being defined by the number of bits that may be stored per memory cell. For example, a single-level cell (SLC) format may write one bit of information per memory cell, a multi-level cell (MLC) format may write two bits of information per memory cell, a triple-level cell (TLC) format may write three bits of information per memory cell, a quadruple-level cell (QLC) format may write four bits of information per memory cell, and so on.

The format used to store data on the memory device may determine how data is coded in the cells on the memory device. Unlike a SLC storage device with a single threshold voltage and a transistor that is either on or off, a TLC storage device may have eight different voltage states and a QLC cell storage device may have sixteen possible voltage states. Data may be coded on a multi-bit cell based on different states of the memory cell and may be coded in an upper page, a middle page, and a lower page. When the data is being read from the memory device, the decoding of the middle page may generally be more error prone, and decoding of the middle page may be slower than the decoding of the lower/upper pages. As such, the read time associated with reading data from, for example, a TLC block may be two and a half to three times longer (for example, 100-120 microseconds ($\mu$s)) than the read time associated with reading data from a SLC block (for example, 25-30 $\mu$s). The middle pages may thus generally add extra latency to one overall TLC/QLC page read.

The storage device may execute read sense as part of a read operation that involves obtaining data from a physical location in the memory device. All the pages may be sensed in a sequence, mostly in parallel. Although the difference in the sense time for the middle page and the sense time for the upper/lower pages is typically small, if the storage device is, for example, reading a large amount of data from a TLC memory device, the difference in the sense time may add up and may significantly impact the overall performance of the storage device. To avoid this performance hit, some industry providers using multi-bit memory devices including for example, TLC memory devices, may not use the middle pages to store data. While avoiding the middle pages in TLC memory devices may result in faster read performance, it increases the bit cost.

The storage device may implement a read look ahead (RLA) feature wherein based on a current host read request, the storage device may determine a pattern in the data being requested by the host and predict data that may be included in a subsequent host read request. During an idle period, the storage device may read the predicted data and may cache the predicted data in an RLA buffer on the storage device. When the host sends the subsequent read request for the predicted data, the storage device may retrieve the requested data from the RLA buffer rather than from the memory device, providing better read performance. Acting as a buffering agent, the RLA buffer may thus enable the storage device to quickly respond to host read requests and hide latencies associated with accessing directly from the memory device.

The RLA buffer has a finite capacity and may be dynamically allocated to one or more host read streams. For example, the maximum capacity of an RLA buffer may be 796 kilobytes (KB) which may be divided among multiple hosts read streams. When a portion of the RLA buffer is assigned to, for example, a first host read stream, the capacity of the assigned portion may reduce the effective sequential read performance gain associated with the RLA feature. While the response latency for the first host read stream may be low when there is space in the RLA buffer, there may be a sudden quality-of-service drop when the RLA buffer assigned to the first host read stream is used up, especially when reading from a TLC/QLC memory device during a sustained workload.

SUMMARY OF THE INVENTION

In some implementations, a storage device executes fluctuating read look ahead (RLA) caching to manage an RLA buffer. The storage device includes a memory device to store data in a multi-bit cell format including an upper page, a middle page, and a lower page and a RLA buffer to store data retrieved from the memory device. A controller on the storage device may receive a host read request for data stored on the memory device and predict data to be included in a subsequent host read request. The controller may then determine a set of pages storing the predicted data, identify latency-oriented pages in the set of pages, retrieve data from the latency-oriented pages, and store the data in the RLA buffer. When the storage device receives the subsequent host read request including the predicted data, the controller may read a first portion of the predicted data from the RLA buffer and a second portion of the predicted data from the memory device.

In some implementations, a method is provided for executing fluctuating RLA caching to manage a RLA buffer in a storage device. The method includes receiving a host read request for data stored on a memory device and predicting data to be included in a subsequent host read request. The method also includes determining a set of pages in the memory device storing the predicted data and identifying latency-oriented pages in the set of pages. The method further includes retrieving data from the latency-oriented pages and storing the data in an RLA buffer. The method also includes receiving the subsequent host read request including the predicted data and reading a first portion of the predicted data from the RLA buffer and a second portion of the predicted data from the memory device.

In some implementations, a storage device executes fluctuating RLA caching to manage an RLA buffer. The storage device includes a controller to receive a host read request for data stored on the memory device. The controller determines read accesses falling within a sequential logical range and predicts data to be included in a subsequent host read request. The controller identifies a latency-oriented portion of the sequential logical range and reads the latency-oriented portion of the sequential logical range prior to receiving the subsequent host read request. The controller reads a non-latency-oriented portion of the sequential logical range after receiving the subsequent host read request.

BRIEF DESCRIPTION OF THE DRAWINGS

FIG. 5 is an example flow diagram for how the storage device performs fluctuating read look ahead caching in accordance with some implementations.

Figure 1:
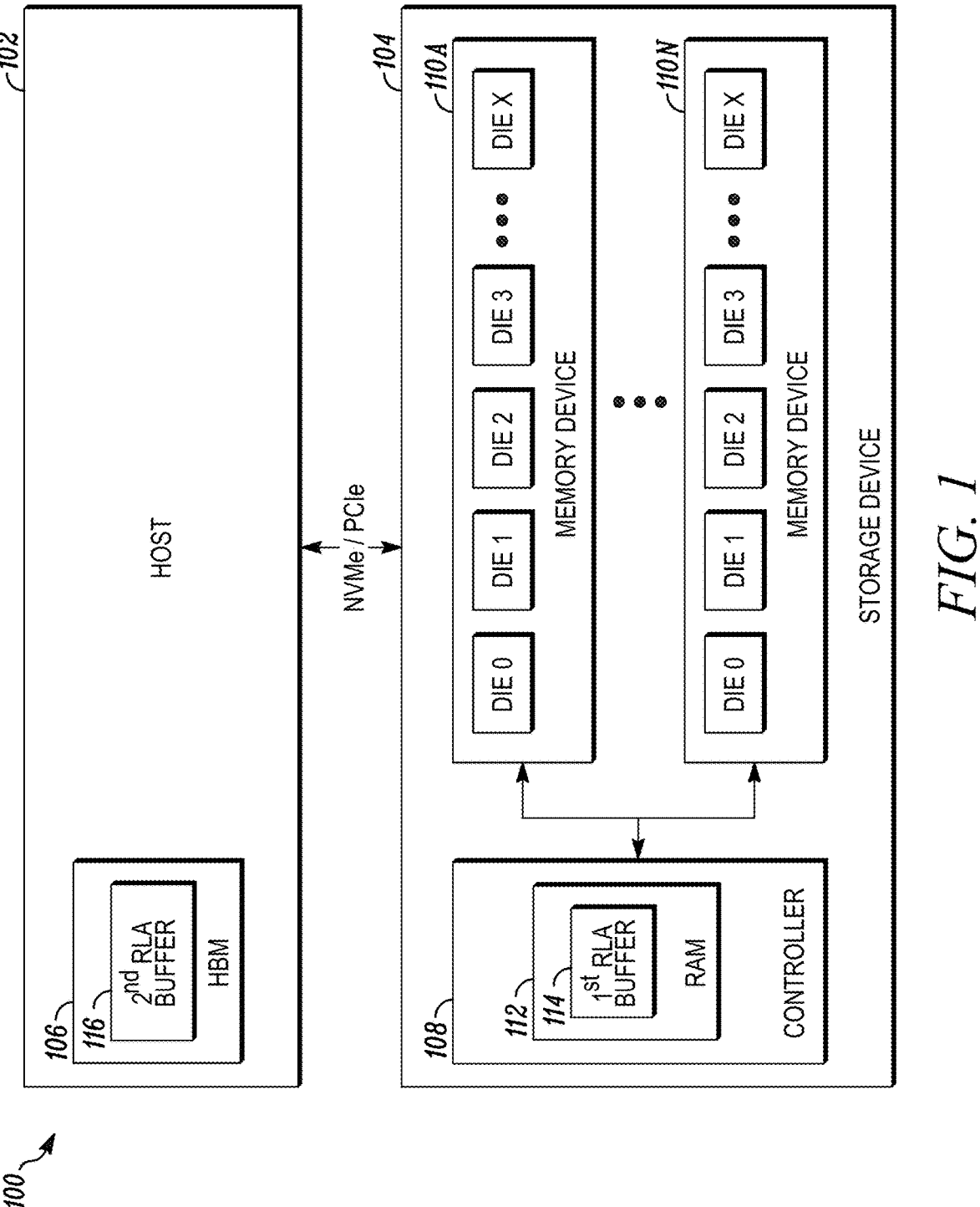
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 may transmit commands to read or write data to storage device 104. Host 102 may include a host memory buffer (HMB) 106 to store, for example, a read look ahead (RLA) buffer 116 (also referred to herein as a second RLA buffer 116) used by storage device 104. Host 102 and storage device 104 may be in the same physical location as components on a single computing device or on different computing devices that are communicatively coupled. Storage device 104, in various implementations, may be disposed in one or more different locations relative to the host 102 and storage device 104 may communicate with host 102 over a peripheral component interconnect express (PCIe) protocol and the like. Host 102 may include additional components (not shown in this figure for the sake of simplicity).

Storage device 104 may include a controller 108, one or more non-volatile memory devices 110a-110n (referred to herein as the memory device(s) 110), and a random-access memory (RAM) 112. Storage device 104 may be, for example, a solid-state drive (SSD). RAM 112 may be static RAM (SRAM) or dynamic RAM (DRAM) that may be used to store information used on storage device 104. RAM 112 may also include a RLA buffer 114 (also referred to as a first RLA buffer 114).

Controller 108 may interface with host 102 and process foreground operations including instructions transmitted from host 102. For example, controller 108 may read data from and/or write to memory device 110 based on instructions received from host 102. When controller 108 receives a read request from host 102 (referred to as a current host read request), controller 108 may determine a pattern in the current host read request and predict data that may be included in an upcoming/subsequent host read request. Controller 108 may retrieve one or more logical block address(es) (LBAs) from the current host read request and may map a logical block address in the host read request to a physical block address on memory device 110. Based on the LBAs in the host read request, controller 108 may determine a logical LBA range and/or the related physical location(s) on memory device 110 that may be associated with the predicted data.

Memory device 110 may be flash based. For example, memory device 110 may be a NAND or NOR flash memory that may be used for storing host and control data over the operational life of memory device 110. Memory device 110 may include multiple dies (for example, DIE 0-DIE X) for storing the data. Data may be stored in blocks on the dies in various formats, with the formats being defined by the number of bits that may be stored per memory cell. Memory device 110 may be included in storage device 104 or may be otherwise communicatively coupled to storage device 104.

In one implementation, when controller 108 receives a current host read request, determines a pattern in the current host read request, and predicts data that may be included in an upcoming/subsequent host read request, controller 108 may identify an associated logical range and/or a set of physical pages storing the predicted data and may determine which of those physical pages are more latency oriented. Controller 108 may cache/buffer the data in the latency-oriented pages (referred to herein as a first portion of the predicted data) in first RLA buffer 114 and leave the data in the non-latency-oriented pages (referred to herein as a second portion of the predicted data) in memory device 110, thus implementing fluctuating RLA caching to optimize usage of first RLA buffer 114.

As there may be many factors which may increase the read sense time of middle pages on, for example, a TLC/QLC memory device, controller may determine that the middle pages storing the predicted data are the latency-oriented pages. For example, the middle pages may have relatively more program-disturbs which may result in more correctable error correction codes (CECC) and extra senses to read the data with different digital-to-analog convertor (DAC) voltages. As such, reading data directly from middle pages when controller 108 receives a current host read request may be more latency oriented than reading data from upper and lower pages.

Rather than caching all the predicted data in first RLA buffer 114, controller 108 may efficiently manage the capacity restrictions of RLA buffer by implementing fluctuating RLA caching wherein, controller 108 may cache the predicted data stored in the latency-oriented (for example, middle) pages and leave the predicted data in the non-latency-oriented (for example, upper and/or lower) pages. When controller 108 receives a subsequent read request for the predicted data, controller 108 may retrieve data stored in the latency-oriented (middle) pages from first RLA buffer 114 and may retrieve data stored in the non-latency-oriented pages directly from memory device 110. Thus, storage device 104 may substantially increase the efficiency of first RLA buffer 114 utilization (for example, by three times when the data in the middle pages in a TLC memory device is cached in first RLA buffer 114 using the fluctuating RLA caching). When a QLC memory device 110 is used, data in the middle two pages may be cached in first RLA buffer 114, which may result in two times more efficient utilization of first RLA buffer 114. As such, using the same size first RLA buffer 114, storage device 104 may provide the fluctuating RLA caching for a greater range of data and/or provide the fluctuating RLA caching to a greater number of streams or hosts 102.

Controller 108 may also use second RLA buffer 116 in HMB 106, in addition to or instead of first RLA buffer 114. Controller 108 may perform intermittent/fluctuating caching of some pages (i.e., a first portion of the data retrieved from the latency-oriented pages) in second RLA buffer 116, optionally perform intermittent/fluctuating caching of some pages (i.e., a second portion of the data retrieved from the latency-oriented pages) in first RLA buffer 114, and may leave the rest of pages (i.e., the data in the non-latency-oriented pages) in memory device 110. Controller 108 may read cached data from second RLA buffer 116 and/or first RLA buffer 114 for read requests from some streams (or hosts) or controller 108 may abstain from caching data in second RLA buffer 116 and/or first RLA buffer 114 for read requests from other streams (or hosts).

Storage device 104 may balance the workload in pre-read paths (i.e., read paths associated with the RLA caching) and current read paths (i.e., read paths associated with data accessed directly from memory device 110) for read accesses falling within a sequential logical range. In the pre-read paths and the current read paths, the data to be read may be in different types of physical locations owing to the characteristics of memory device 110. In balancing the workload, controller 108 may read a first portion (i.e., a more latency-oriented portion) of the sequential logical range prior to receiving a host read request and may read a second portion (i.e., a less latency-oriented portion) of the sequential logical range after receiving the host read request.

Controller 108 may accomplish the workload balancing with a tuning module for RLA. The tuning module may determine a first type and number of physical pages, in each logical range, to cache in a RLA buffer prior to receiving a host read request. The tuning module may also determine a second type and number of physical pages, in each logical range, to ignore (i.e., leave on memory device 110 and not cache in the RLA buffer prior to receiving a host read request, wherein the ignored pages may be retrieved directly from memory device 110 after receipt of the host read request). The tuning module may effectuate the fluctuating RLA caching based, for example, on the host data access rate and/or the historical hit rate for the RLA for a given stream among a plurality of streams. Thus, only those high latency pages which controller 108 may determine may cause bottleneck in meeting a host data rate would be optimally fetched ahead of time and cached in first RLA buffer 114 and/or second RLA buffer 116, leaving on memory device 110 the physical pages that can be accessed after receipt of the host read request.

Even if the backend is slow (for example, intrinsically slow or due to a workload state), using the same size RLA buffer for the fluctuating RLA caching as compared with non-fluctuating RLA caching (i.e., a legacy RLA scheme), the fluctuating RLA caching may extend the performance continuity for a stream since continuous caching may only be partial, and the rest of the RLA caching may fluctuate. As such, in the read path, a first set of logical data may be cached in the RLA buffer and a second set of the data may be accessed from memory device 110, a third set of logical data may be cached in the RLA buffer and a fourth set of the data may be accessed from memory device 110, and so on, in a zig-zag/fluctuating fashion. This may place less stress on accessing memory device 110, enabling storage device 104 to enhance the read quality-of-service with less cache resources at a time of need and/or for a stipulated time.

In some implementations, controller 108 may take into consideration the read vulnerability as a latency factor for the read look ahead feature. In such cases, if controller 108 determines that a set of logical addresses associated with a wordline has higher read vulnerable factor/syndrome weight (for example, bit-error rate (BER) from classic cell-voltage-distribution (CVD) tables), then controller 108 may consider the pages associated with the set of logical addresses for fluctuating RLA caching, leaving the rest of the pages (i.e., pages with a lower syndrome weight) to be read from memory device 110 during host read requests. Since the capacity of RAM 112 may be limited, controller 108 may cache such specific high latency RLA candidates in HMB 106.

In cases involving stringent memory margins, controller 108 may determine its response time, i.e., the time taken by storage device 104 to provide a first byte to host 102 in response to a host read request. Based on the response time, controller 108 may partially cache a portion of the predicted data for a stream (or a host) in first RLA buffer 114. As such, when host 102 issues a subsequent/second read request for the predicted data, in response to the second read request, controller 108 may fetch a portion of the predicted data directly from memory device 110 and a portion of the predicted data from first RLA buffer 114. Controller 108 may also determine the amount of predicted data to cache in first RLA buffer 114 and the amount of predicted data to leave in memory device 110 based, for example, on the system latency, thereby ensuring RAM 112 may be used efficiently and that the data pipeline is not broken in the read path. Storage device 104 may additionally consider its state machine and dynamically evaluate the backend response time for a given workload and accordingly allocate and manage its RLA resources for each of the streams or hosts 102 in a multi-host environment.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
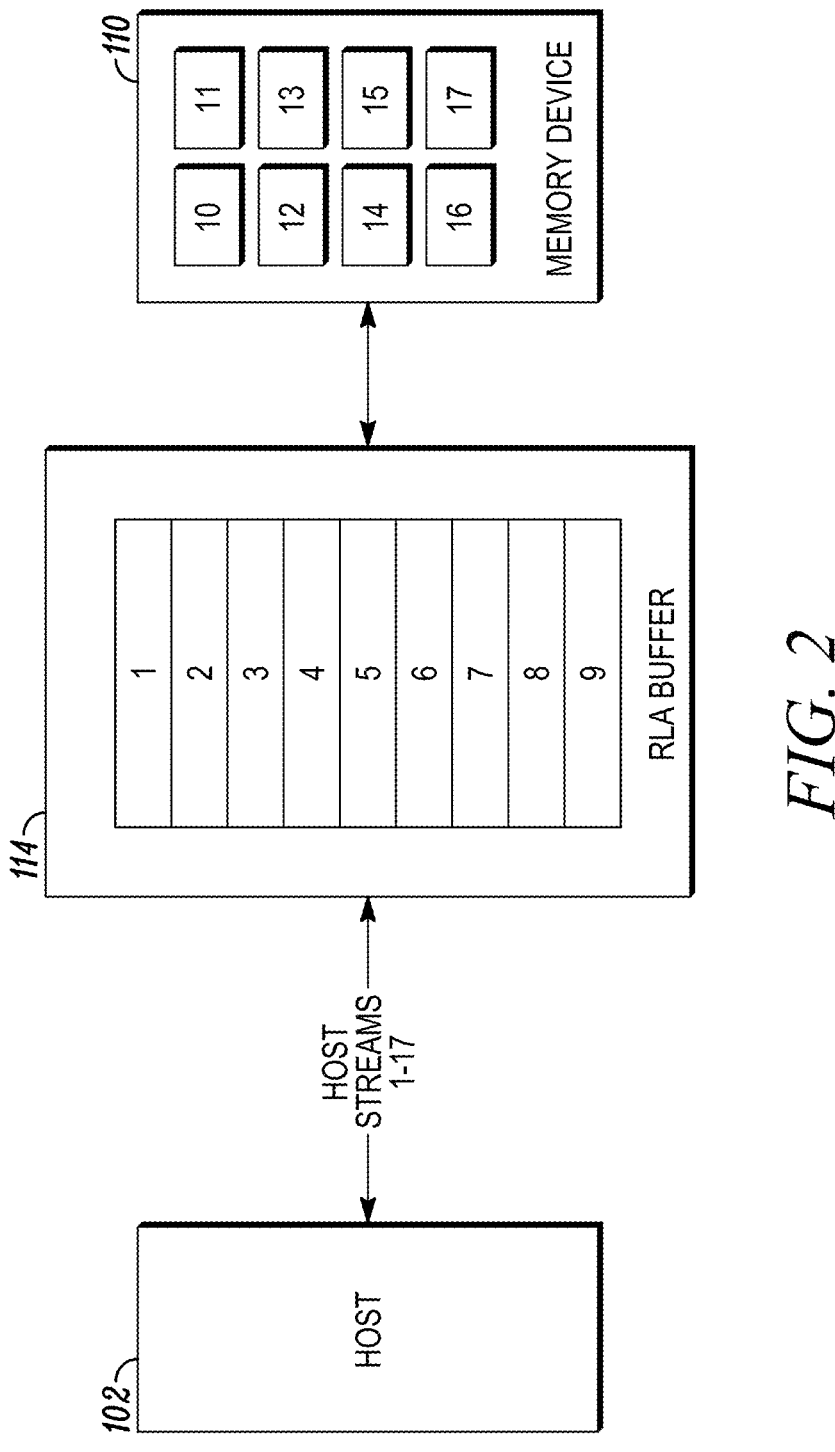
FIG. 2 is an example block diagram of a current read look ahead process.

FIG. 2 is an example block diagram of a current read look ahead process. Host 102 may perform sequential reads and may read data associated with LBAs/host streams 1-17. Controller 108 may predict that host 102 may send a host read request for LBAs 1-17 and may prefetch data associated with those LBAs. The data prefetched by controller 108 may be limited by the capacity of first RLA buffer 114. For example, based on the capacity of first RLA buffer 114, controller 108 may prefetch the data associated with LBAs 1-9. If there is idle time between a current host read request for the data associated with LBAs 1-9 and a subsequent host read request for the data associated with LBAs 10-17, then controller 108 may predict the logical range for the subsequent host read request and may prefetch and cache the data associated with LBAs 10-17 during the idle time. If there is no idle time between a current host read request for the data associated with LBAs 1-9 and a subsequent host read request for the data associated with LBAs 10-17, then controller 108 may fetch the data associated with LBAs 10-17 from memory device 110 when controller 108 receives the subsequent host read request, possibly affecting the performance of storage device. As indicated above FIG. 2 is provided as an example. Other examples may differ from what is described in FIG. 2.

Figure 3:
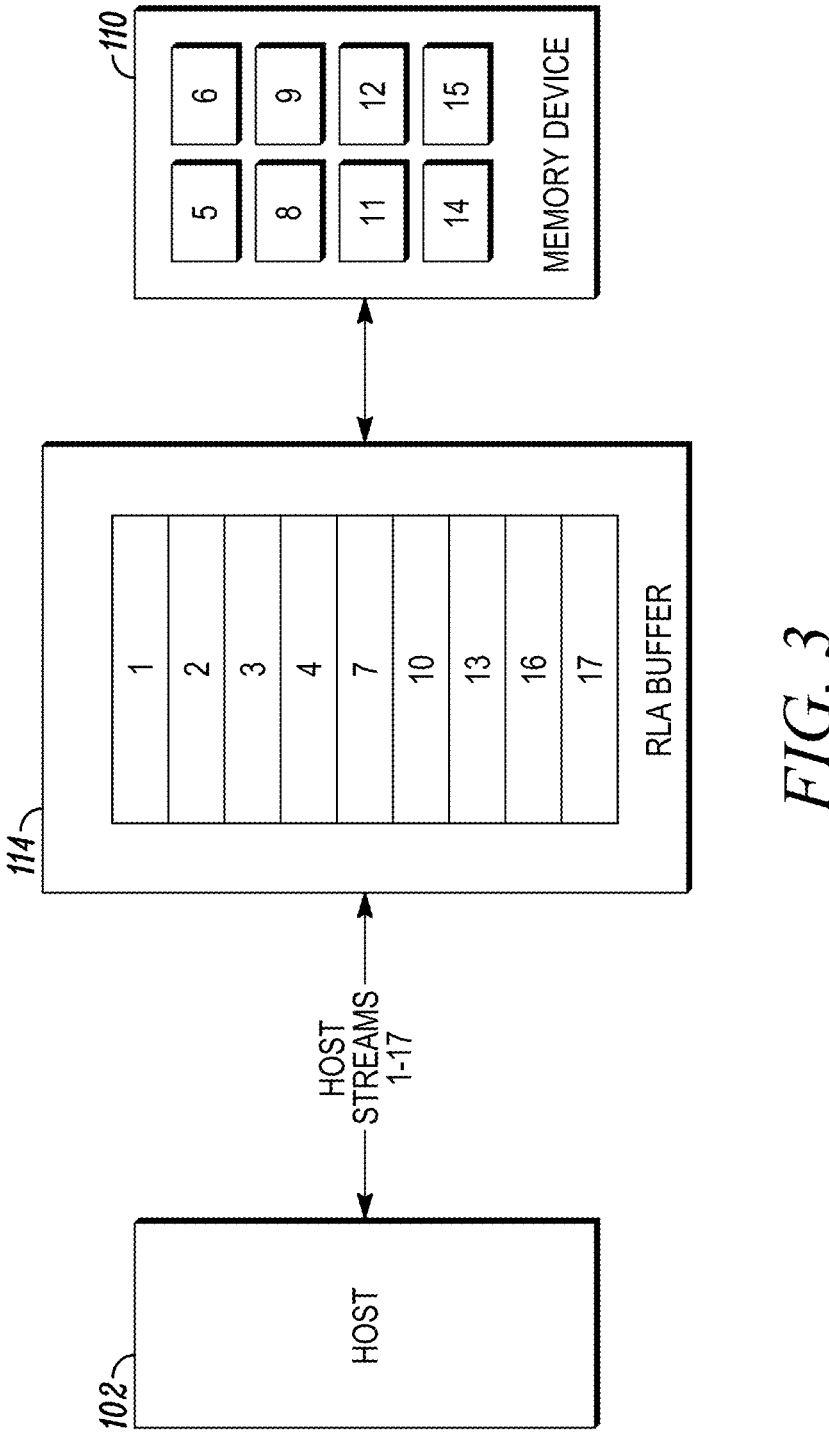
FIG. 3 is an example block diagram of a fluctuating read look ahead process used in accordance with some implementations.

FIG. 3 is an example block diagram of a fluctuating read look ahead process used in accordance with some implementations. Host 102 may perform sequential reads and may read data associated with, for example, host streams/LBAs 1-17. Controller 108 may predict that host 102 may send a host read request for LBAs 1-17 and may prefetch data associated with pages in that logical range with a higher latency. For example, controller 108 may determine that the data for LBAs 5, 6, 8, 9, 11, 12, 14, and 15 are stored in pages with lower latency, for example, upper and lower pages or pages with lower BER. As such, controller 108 may not cache the data for LBAs 5, 6, 8, 9, 11, 12, 14, and 15 in first RLA buffer 114 when controller 108 performs a read look ahead function. Controller 108 may however determine that the data for LBAs 1, 2, 3, 4, 7, 10, 13, 16 and 17 that are predicted to be requested in a subsequent host read request are stored in higher latency pages including, for example, middle pages or pages with higher BER. Controller 108 may thus prefetch and cache the data for LBAs 1, 2, 3, 4, 7, 10, 13, 16 and 17 in first RLA buffer 114 when controller 108 performs a read look ahead function.

When host 102 sends a first read request for, for example, LBAs 1-10, controller 108 may read LBAs 1-4 from first RLA buffer 114, read LBAs 5 and 6 from memory device 110, read LBA 7 from first RLA buffer 114, read LBAs 8 and 9 from memory device 110, and read LBA 10 from first RLA buffer 114. Similarly, when host 102 send a second read request for, for example, LBAs 11-17, controller 108 may execute the fluctuation RLA caching by reading LBAs 11 and 12 from memory device 110, reading LBA 13 from first RLA buffer 114, reading LBAs 14 and 15 from memory device 110, and reading LBAs 16 and 17 from first RLA buffer 114.

Considering that the capacity of first RLA buffer 114 is the same in FIG. 2 and FIG. 3, using the fluctuating RLA feature, controller 108 may optimize the use of first RLA buffer 114 and prefetch and cache data associated with a larger LBA range, improving the performance of storage device 104 even when there is limited or no idle time between host read requests. As indicated above FIG. 3 is provided as an example. Other examples may differ from what is described in FIG. 3.

Figure 4:
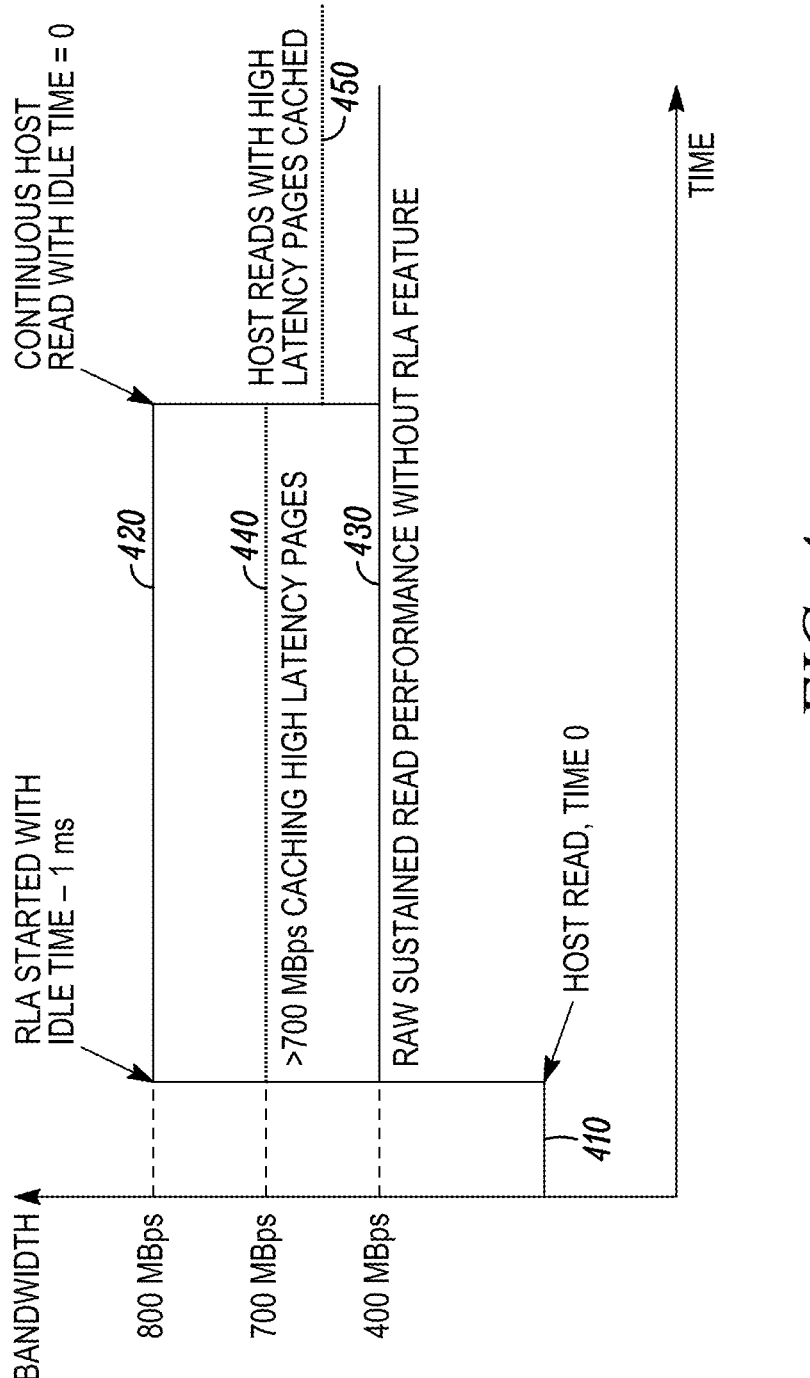
FIG. 4 is an example diagram showing the read performance of a storage device implementing legacy read look ahead and fluctuating read look ahead with varying idle times between host read requests in accordance with some implementations.

FIG. 4 is an example diagram showing the read performance of a storage device implementing legacy read look ahead and fluctuating read look ahead with varying idle times between host read requests in accordance with some implementations. Controller 108 may implement RLA caching during a backend idle time between the two host read commands and cache the predicated data in RLA buffer 114/116, wherein the cached data may be sent to host 102 when storage device 104 receives an upcoming host command. As such the idle time between the two host read commands may be critical in RLA caching. If host 102 does not provide any idle time, then the effective throughput of storage device 104 may be the raw sustained read performance.

Using the example in FIG. 4, storage device 104 may initially respond to a first host read request at time 0 at approximately 400 megabytes per second (MBps) (shown by line 410). Based on the first host read request and with an idle time of, for example, one millisecond (ms) between the first host read request and a second host read request, controller 108 may execute a read look ahead feature. If controller 108 implements a legacy read look ahead, wherein all of predicted data is prefetched and cached in first RLA buffer 114 and/or in second RLA buffer 116, storage device 104 may respond to a second host read request to read data cached in first RLA buffer 114 and/or in second RLA buffer 116 at approximately 800 MBps (shown by line 420). If there is higher host interface throughput with no idle times between the host read requests, storage device 104 may not have enough time to cache the data in upcoming read requests and may be unable to meet the higher read performance of approximately 800 MBps. The read performance of storage device 104 may drop and may meet the storage device raw sustained read performance of approximately 700 MBps (shown by line 430).

If during the 1 ms between the first host read request and the second host read request, controller 108 implements the fluctuating RLA caching, wherein predicted data in high latency pages is prefetched and cached in first RLA buffer 114 and/or second RLA buffer 116, storage device 104 may respond to the second host read request to read data cached in first RLA buffer 114 and/or second RLA buffer 116 at approximately 750 MBps (shown by line 440). It should be noted that storage device 104 performance may not be as high with the fluctuating RLA caching as it may be with the legacy RLA caching. However, storage device 104 performance with the fluctuating RLA caching may be better than the raw sustained read performance and storage device 104 performance with the fluctuating RLA caching may be higher overall than the legacy RLA caching in situations where there is limited or no idle time between host read request. As such, if there is higher host interface throughput with no idle times between the host read requests, storage device 104 may not have enough time for to cache more predicted data in high latency pages in upcoming read requests and may be unable to meet the higher read performance of approximately 750 MBps. Nevertheless, storage device 104 may have buffered a larger range of pages, as shown, for example, in FIG. 3. Thus, the read performance of storage device 104 may drop to approximately 725 MBps, which may be higher than the raw sustained read performance of 700 MBps (shown by line 450). As indicated above FIG. 4 is provided as an example. Other examples may differ from what is described in FIG. 4.

FIG. 5 is an example flow diagram for how the storage device performs fluctuating read look ahead caching in accordance with some implementations. At 510, storage device 104 may receive a first host read request and controller 108 may determine the predicted data that may be associated with a second host read request. At 520, controller 108 may determine the logical range and/or physical pages storing the predicted data and may determine which of those physical pages are more latency oriented. At 530, controller 108 may buffer the data in the latency-oriented pages in first RLA buffer 114 and/or second RLA buffer 116 and leave the data in the non-latency-oriented pages in memory device 110.

At 540, storage device 104 may receive the second host read request and may balance the workload in the pre-read paths and the current read paths for read accesses falling in a sequential logical range. At 550, in response to the second host read request, controller may read one or more sets of logical data from the RLA cache and one or more pages of data from memory device 110 in a fluctuating fashion. As indicated above FIG. 5 is provided as an example. Other examples may differ from what is described in FIG. 5.

Figure 6:
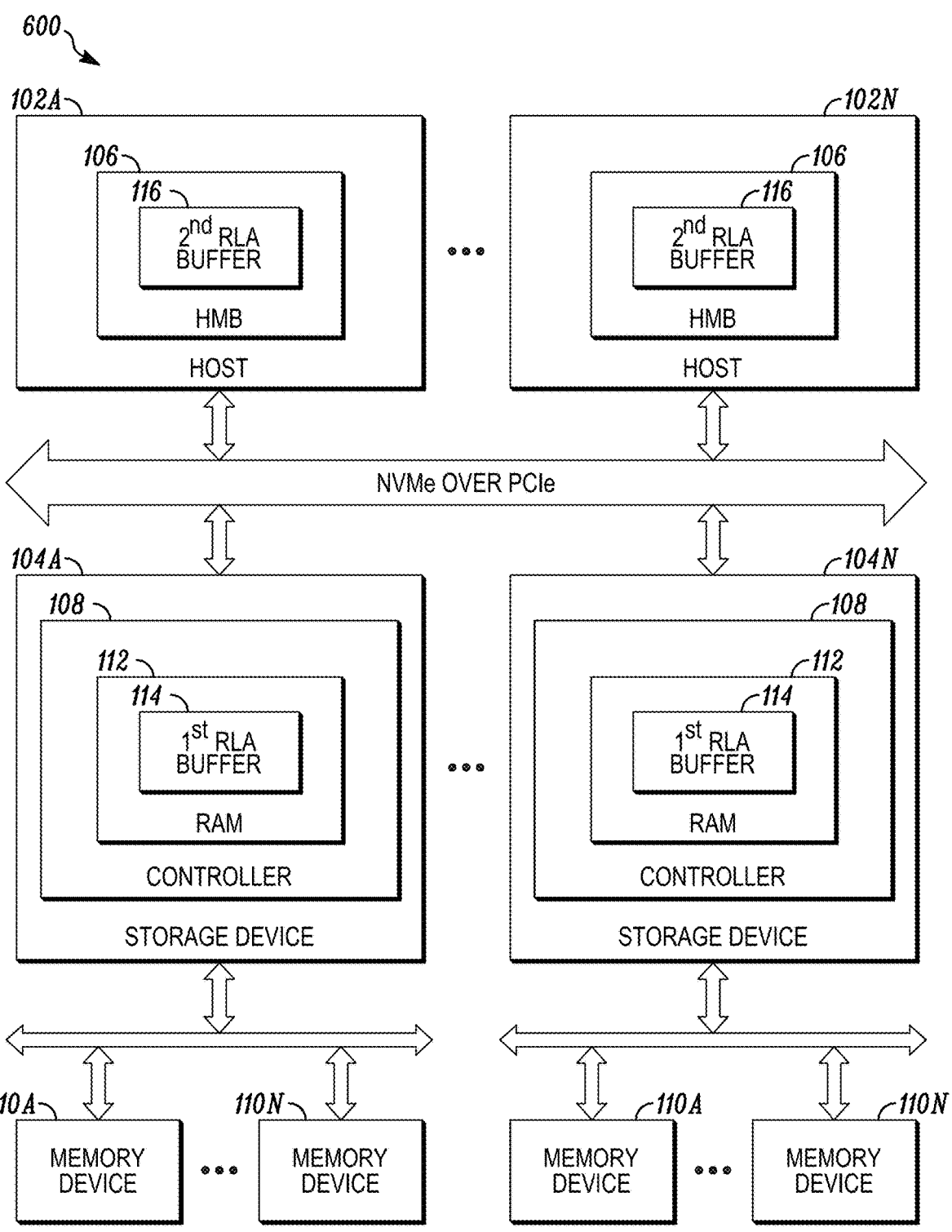
FIG. 6 is a diagram of an example environment in which systems and/or methods described herein are implemented.

FIG. 6 is a diagram of an example environment in which systems and/or methods described herein are implemented. As shown in FIG. 6, Environment 600 may include hosts 102a-102n (referred to herein as host(s) 102), and one or more storage devices 104a-104n (referred to herein as storage device(s) 104). Storage device 104 may include a controller 108 to implement fluctuating RLA caching. Hosts 102 and storage devices 104 may communicate via Non-Volatile Memory Express (NVMe) over peripheral component interconnect express (PCI Express or PCIe), SD, or the like.

Devices of Environment 600 may interconnect via wired connections, wireless connections, or a combination of wired and wireless connections. For example, the network in FIG. 6 may include NVMe over Fabric (NVMe-oF) Internet Small Computer Systems Interface (iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of Environment 600 may perform one or more functions described as being performed by another set of devices of Environment 600.

Figure 7:
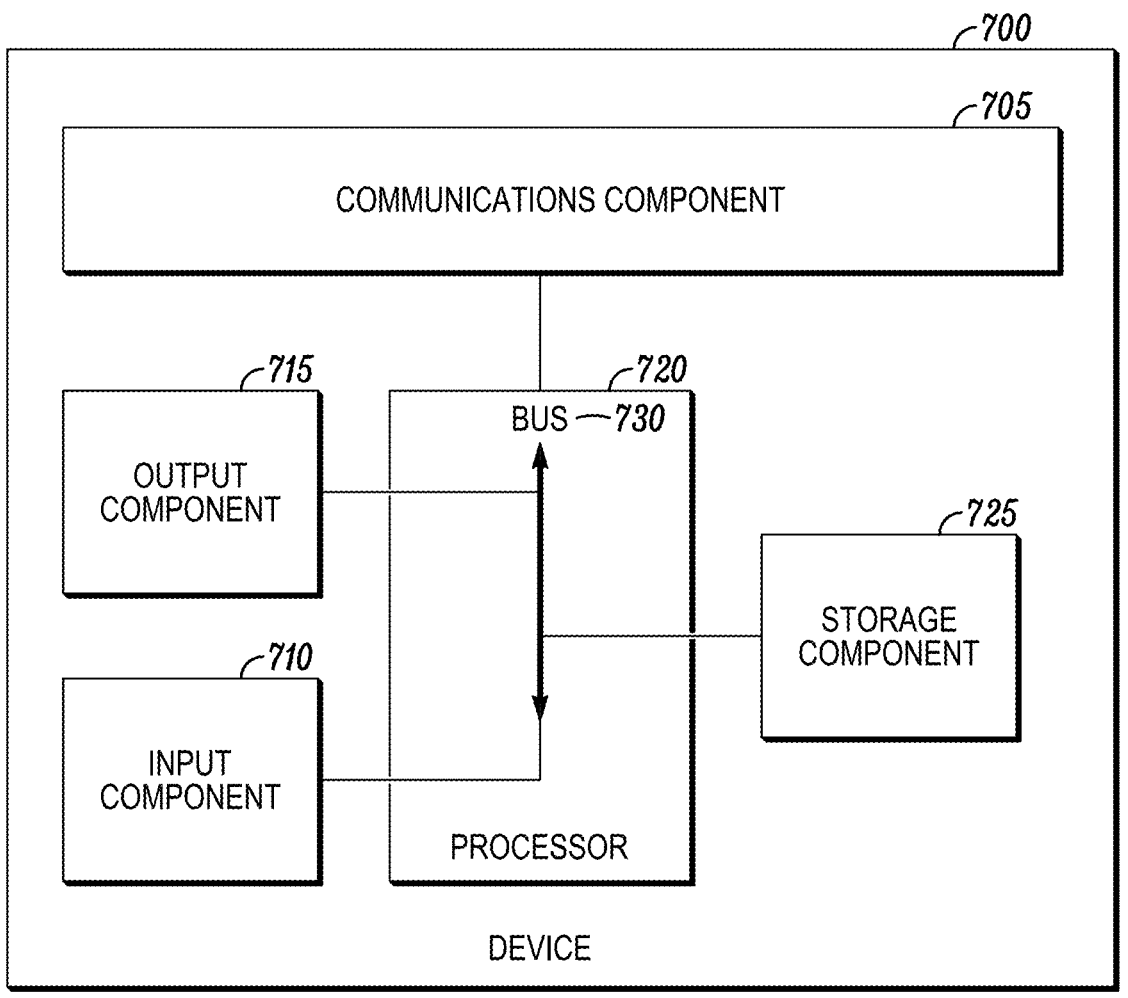
FIG. 7 is a diagram of example components of one or more devices of FIG. 1.

FIG. 7 is a diagram of example components of one or more devices of FIG. 1. In some implementations, host 102 may include one or more devices 700 and/or one or more components of device 700. Device 700 may include, for example, a communications component 705, an input component 710, an output component 715, a processor 720, a storage component 725, and a bus 730. Bus 730 may include components that enable communication among multiple components of device 700, wherein components of device 700 may be coupled to be in communication with other components of device 700 via bus 730.

Input component 710 may include components that permit device 700 to receive information via user input (e.g., keypad, a keyboard, a mouse, a pointing device, and a network/data connection port, or the like), and/or components that permit device 700 to determine the location or other sensor information (e.g., an accelerometer, a gyroscope, an actuator, another type of positional or environmental sensor). Output component 715 may include components that provide output information from device 700 (e.g., a speaker, display screen, and network/data connection port, or the like). Input component 710 and output component 715 may also be coupled to be in communication with processor 720.

Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 may include one or more processors capable of being programmed to perform a function. Processor 720 may be implemented in hardware, firmware, and/or a combination of hardware and software.

Storage component 725 may include one or more memory devices, such as random-access memory (RAM 112), read-only memory (ROM), and/or another type of dynamic or static storage device (e.g., a flash memory, a magnetic memory, and/or optical memory) that stores information and/or instructions for use by processor 720. A memory device may include memory space within a single physical storage device or memory space spread across multiple physical storage devices. Storage component 725 may also store information and/or software related to the operation and use of device 700. For example, storage component 725 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 705 may include a transceiver-like component that enables device 700 to communicate with other devices, such as via a wired connection, a wireless connection, or a combination of wired and wireless connections. The communications component 705 may permit device 700 to receive information from another device and/or provide information to another device. For example, communications component 705 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 705 may also include one or more broadband and/or narrowband transceivers and/or other similar types of wireless transceiver configurable to communicate via a wireless network for infrastructure communications. Communications component 705 may also include one or more local area network or personal area network transceivers, such as a Wi-Fi transceiver or a Bluetooth transceiver.

Device 700 may perform one or more processes described herein. For example, device 700 may perform these processes based on processor 720 executing software instructions stored by a non-transitory computer-readable medium, such as storage component 725. As used herein, the term "computer-readable medium" refers to a non-transitory memory device. Software instructions may be read into storage component 725 from another computer-readable medium or from another device via communications component 705. When executed, software instructions stored in storage component 725 may cause processor 720 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device executes fluctuating read look ahead (RLA) caching to manage a RLA buffer, the storage device comprises:

a memory device to store data in a multi-bit cell format including an upper page, a middle page, and a lower page;

an RLA buffer to store data retrieved from the memory device; and a controller to receive a first host read request for data stored on the memory device, predict data to be accessed in a second host read request, determine a set of pages storing the predicted data, identify latency-oriented pages in the set of pages, retrieve data from the latency-oriented pages and store the data in the RLA buffer, receive the second host read request accessing the predicted data, and read a first portion of the predicted data from the RLA buffer and a second portion of the predicted data from the memory device.

2. The storage device of claim 1, wherein the controller determines that middle pages storing the predicted data are latency-oriented pages.

3. The storage device of claim 1, wherein the controller uses a host memory buffer to store data retrieved from the latency-oriented pages.

4. The storage device of claim 1, wherein the controller effectuates fluctuating RLA caching based on at least one of a response time, system latency, and a backend response time for a given workload.

5. The storage device of claim 1, wherein the controller stores a first portion of the data retrieved from the latency-oriented pages in a host memory buffer and stores a second portion of the data retrieved from the latency-oriented pages in the RLA buffer.

6. The storage device of claim 5, wherein when the controller receives the second host read request, reads at least one of the first portion of the data retrieved from the latency-oriented pages from the host memory buffer and reads the second portion of the data retrieved from the latency-oriented pages from the RLA buffer.

7. The storage device of claim 5, wherein the controller at least one of (a) abstains from caching the first portion of the data retrieved from the latency-oriented pages in the host memory buffer and (b) abstains from caching the second portion of the data retrieved from the latency-oriented pages in the RLA buffer.

8. The storage device of claim 1, wherein the controller includes a tuning module to determine a first number and a first type of physical pages, in a logical range, to buffer in the RLA buffer prior to receiving the second host read request and to determine a second number and a second type of physical pages, in the logical range, to retrieve from the memory device after receipt of the second host read request.

9. The storage device of claim 8, wherein the tuning module effectuates fluctuating RLA caching based on at least one of a host data access rate and a historical hit rate for read look ahead for a given stream.

10. The storage device of claim 1, wherein the controller determines read vulnerability as a latency factor and identifies pages storing data for a set of logical addresses associated with a read vulnerable factor as latency-oriented pages.

11. The storage device of claim 10, wherein the controller caches latency-oriented pages associated with the read vulnerable factor in a host memory buffer.

12. A method for executing fluctuating read look ahead (RLA) caching to manage a RLA buffer in a storage device, the storage device comprises a controller to execute the method comprising:

receiving a first host read request for data stored on a memory device;

predicting data to be accessed in a second host read request;

determining a set of pages in the memory device storing the predicted data;

identifying latency-oriented pages in the set of pages;

retrieving data from the latency-oriented pages and storing the data in an RLA buffer; and receiving the second host read request accessing the predicted data and reading a first portion of the predicted data from the RLA buffer and a second portion of the predicted data from the memory device.

13. The method of claim 12, further comprising at least one of:

determining that middle pages storing the predicted data are latency-oriented pages; and determining read vulnerability as a latency factor and identifying the set of pages storing data for a set of logical addresses associated with a read vulnerable factor as latency-oriented pages.

14. The method of claim 12, further comprising determining a first number and a first type of physical pages, in a logical range, to buffer in the RLA buffer prior to receiving the second host read request and to determining a second number and a second type of physical pages, in the logical range, to retrieve from the memory device after receipt of the second host read request.

15. The method of claim 12, further comprising effectuating fluctuating RLA caching based on at least one of a host data access rate and a historical hit rate for read look ahead for a given stream among a plurality of streams.

16. The method of claim 12, further comprising using host memory buffer to store data retrieved from the latency-oriented pages.

17. The method of claim 16, further comprising storing a first portion of the data retrieved from the latency-oriented pages in a host memory buffer and storing a second portion of the data retrieved from the latency-oriented pages in the RLA buffer.

18. The method of claim 16, further comprising reading, when the controller receives the second host read request, at least one of the first portion of the data retrieved from the latency-oriented pages from the host memory buffer and the second portion of the data retrieved from the latency-oriented pages from the RLA buffer.

19. The method of claim 16, further comprising at least one of abstaining from caching the first portion of the data retrieved from the latency-oriented pages in the host memory buffer and abstaining from caching the second portion of the data retrieved from the latency- oriented pages in the RLA buffer.

20. A storage device executes fluctuating read look ahead (RLA) caching to manage a RLA buffer, the storage device comprises:

a controller to receive a first host read request for data stored on a memory device, determine host read accesses falling within a sequential logical range, predict data to be accessed in a second host read request, identify a latency-oriented portion of the sequential logical range, read the latency-oriented portion of the sequential logical range prior to receiving the second host read request and read a non-latency-oriented portion of the sequential logical range after receiving the second host read request.

* * * * *